United States Patent [19]
Saunders

[11] 3,727,049
[45] Apr. 10, 1973

[54] METHOD FOR DETERMINING IMMISCIBLE WATER CONTENT OF FLUIDS BY SPECTROPHOTOMETER

[75] Inventor: Raymond A. Saunders, Hyattsville, Md.

[73] Assignee: The United States of America as represented by the Secretary of the Navy

[22] Filed: May 1, 1967

[21] Appl. No.: 635,974

[52] U.S. Cl. .................................. 250/43.5 R
[51] Int. Cl. ................................. G01n 21/26
[58] Field of Search .................. 250/43.5 R, 43.5; 23/230

[56] References Cited

UNITED STATES PATENTS

| 2,708,387 | 5/1955 | Broida et al. | 250/43.5 |
| 2,849,617 | 8/1958 | Karasek | 250/43.5 |
| 3,017,802 | 1/1962 | Witt | 250/43.5 |

*Primary Examiner*—James W. Lawrence
*Assistant Examiner*—C. E. Church
*Attorney*—R. S. Sciascia and A. L. Branning

[57] ABSTRACT

A process is given for determining the relative proportion of water present in a fluid medium which involves mixing the medium with solvent to form a solution and analyzing the solution by spectrophotometric means to determine the total water content of the medium.

6 Claims, 2 Drawing Figures

INVENTOR
RAYMOND A. SAUNDERS

BY
ATTORNEY

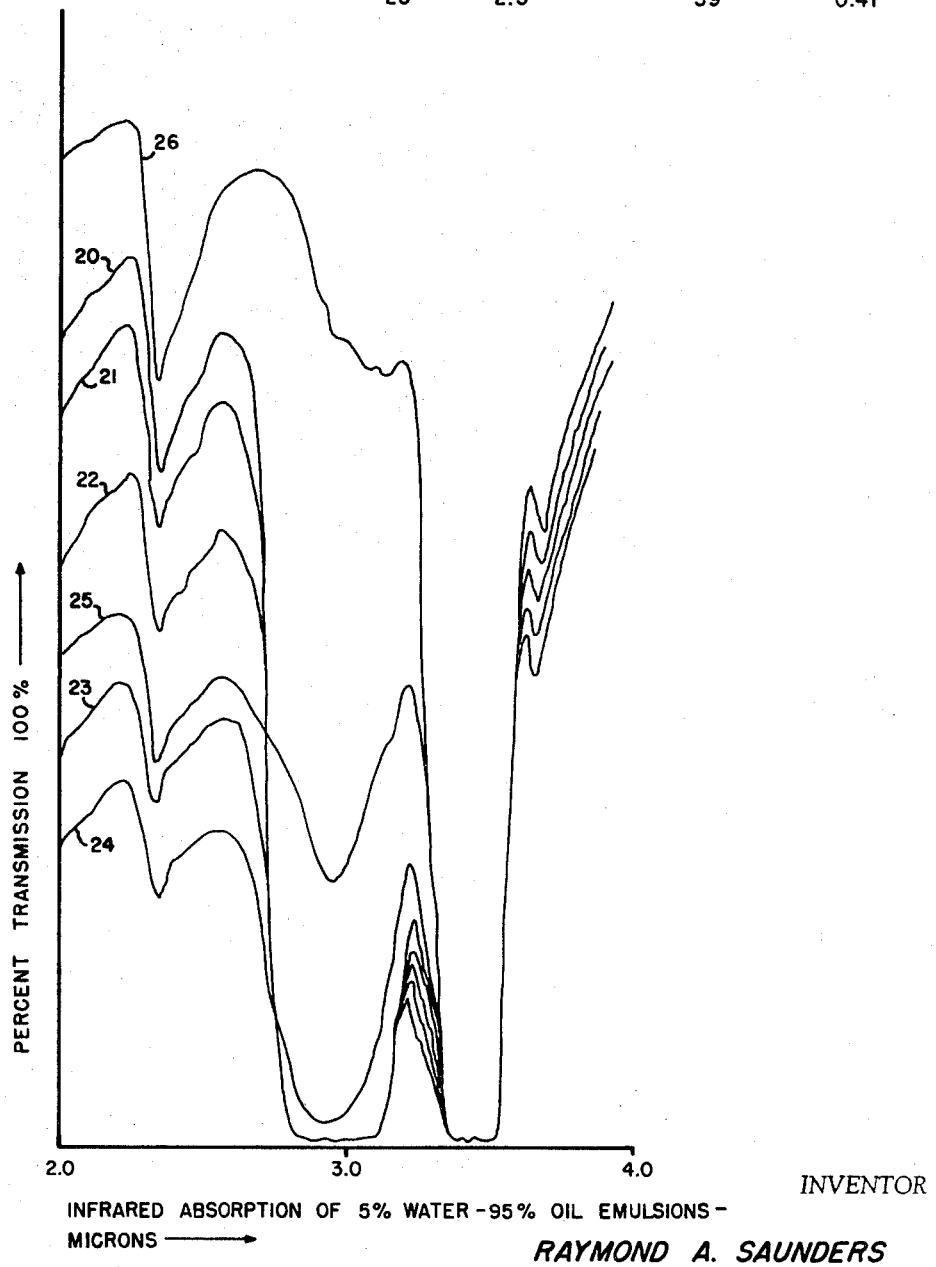

METHOD FOR DETERMINING IMMISCIBLE WATER CONTENT OF FLUIDS BY SPECTROPHOTOMETER

BACKGROUND OF THE INVENTION

1. Field of the Invention

This invention relates to a method for ascertaining the presence of undesirable water in a fluid which is immiscible and more particularly to a method for rapidly and accurately determining the amount of water present in fuels. The presence of immiscible water in animal, vegetable and mineral oils and various fuels derived therefrom including fuels derived from coal, shale and petroleum oils is a particular problem confronting industry. For example, the gasolines and kerosene used in aircraft and automotive internal combustion engines and fuel oils such as Navy Special used in shipboard boilers, are highly susceptible to contamination through the inclusion of water in the system. In shipboard installations the problem of contaminated fuel is particularly serious. During a voyage, empty fuel tanks are filled with sea water to ballast the ship. Emptying the tanks by pumping does not generally remove all of the ballast water prior to refilling the tanks with fuel. Condensation and small leaks from steam heating coils used to maintain heavy oils fluid also contribute to the contamination of the fuel by water. Contamination of fuel leads to serious problems such as flame failure, poor burning in boilers, fouling of boilers by impurities contained in the water and serious wearing and corrosion of fuel handling equipment.

In order to guard against water contamination and to establish the amount of contamination, a method which quickly and accurately detects and determines the quantity of water immiscible in fuels is highly desirable. Where large quantities of fuel are consumed, as aboard ships, a method for continuous pipe line analysis is necessary to instantaneously measure the water content of fuel.

2. Description of the Prior Art

In the field of quantitative moisture analysis it has been the general practice to use conventional moisture analysis procedures which are slow and rather expensive. These techniques while capable of extreme accuracy and precision are not readily amenable to the analysis of contaminated fuels because the water-contaminated fuel has generally been burned or otherwise used before the analytical results are available. Spectrophotometric techniques have been employed in the past to measure water content. All spectrophotometric methods measure the ratio of radiant power of two beams of electromagnetic radiation which may be separated in time, space, or both. The relative absorption of electromagnetic radiation while passing through the sample is used as a measure of the concentration of water in the sample. This technique has been used for determining water content in an attempt to decrease time and cost of analysis. For example, Freedman et al., U.S. Pat. No. 2,487,797, and Brooke, U.S. Pat. No. 3,019,342, use beta rays to measure the moisture content of hydrocarbons. Neither patent, however, employed a solvent to prepare a solution of the immiscible materials, namely the water and hydrocarbon. Karasek, U.S. Pat. No. 2,849,617, employs infra-red radiation to measure the water content of sulfur dioxide which may contain trace amounts of hydrocarbon, but does not employ a solvent to prepare a solution from his two phase system. Broida et al., U.S. Pat. No. 2,708,387, determine the water content of solid material by forming an aqueous solution of deuterium and hydrogen oxide which is analyzed using spectroanalysis. The Broida et al process, however, is not applicable to fuels in which water is immiscible.

When using electromagnetic radiation to measure the water content of immiscible fluids serious problems are encountered as will be more fully discussed in reference to FIG. 2. In general immiscible water, particularly in emulsified form, can be extremely viscous which renders it difficult to force such emulsions through radiation absorption cells of narrow pathlength in continuous analyzers. Immiscible systems are also difficult to maintain in uniform dispersion during analysis, whereby separation of the discontinuous phase often occurs giving inaccurate results. Even when a uniform fluid sample is maintained, individual particles of the discontinuous phase cause scattering of the electromagnetic radiation causing appreciable analytical error.

SUMMARY OF THE INVENTION

The general purpose of this invention is to facilitate the spectral determination of undesirable water dispersed in an immiscible fluid by forming a solution through the addition of a third component in which the components of the immiscible system are mutually and simultaneously soluble. A specific application of this invention is the quantitative determination of water in Navy Special fuel oil. Examples of suitable solvents to solubilize the immiscible fuel are N-ethyl morpholine, tetrahydrofuran, bis(2-ethoxy ethyl) ether and mixtures thereof, although not necessarily limited thereto.

It is therefore an object of the present invention to provide a method to ascertain and measure the relative water content of a fluid in which water is immiscible.

Another object is to provide a method to decrease the viscosity of a fluid, containing immiscible water, for later spectrophotometric analysis of said fluid.

Still another object is to provide a method to insure accurate spectrophotometric detection and determination of the relative proportion of immiscible water present in a fluid.

Still another object is to provide a method to insure spectrophotometric detection and determination of the relative proportion of water immiscible in a fluid over a wide range of concentration.

A significant object of this invention is to provide a method for determining, over a wide concentration range, the water content of Navy Special fuel oil.

BRIEF DESCRIPTION OF THE DRAWING

With these and other objects in view, as will hereinafter more fully appear, and which will be more particularly pointed out in the appended claims, reference is now made to the following description taken in connection with the accompanying drawings in which:

FIG. 2, illustrates graphically the adverse influence water droplets of varying particle size immiscible in a fluid, on the absorption of electromagnetic radiation.

DESCRIPTION OF THE INVENTION

Figure 1:
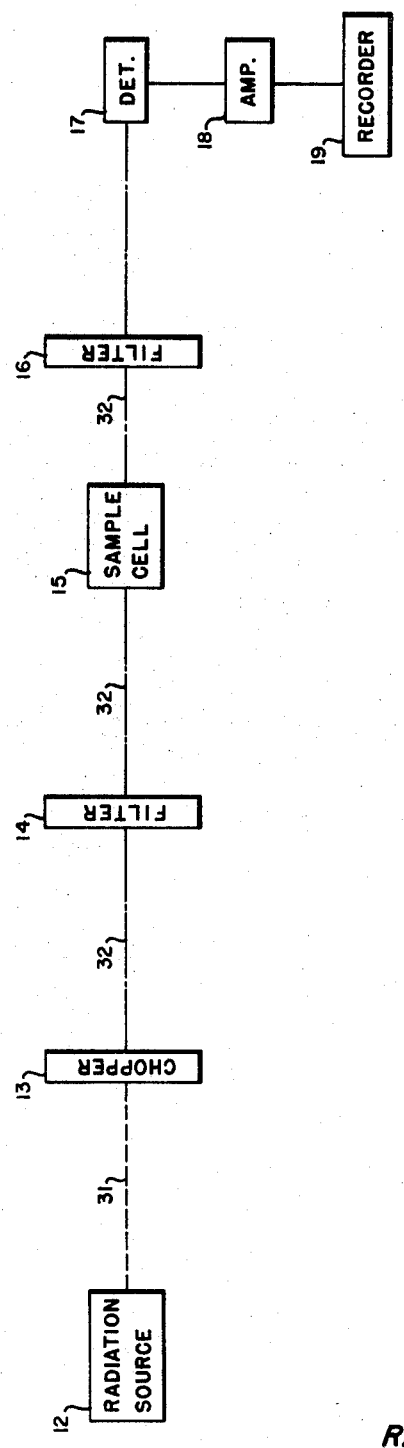
FIG. 1, is a block diagram of a preferred spectrophotometric apparatus employed in practicing this invention.

Referring to FIG. 1 of the drawing, there is diagrammatically shown an infra-red type of spectrophotometric apparatus wherein an infra-red radiation source 12 directs a beam of electromagnetic radiation 31 through a chopper or shutter 13 to produce an alternating beam of electromagnetic radiation, represented as 32. The alternating beam 32 is directed through a filter 14 which limits the longer wavelengths of radiation. On leaving the filter 14, the beam 32 is transmitted through a cell 15 containing the sample to be analyzed. On leaving the cell 15, the beam 32, passes through a second filter 16, which limits the shorter wavelengths of radiation and thence passes to a radiation sensitive device or detector 17, which produces electrical signals correlative to the radiation received thereby. The output of detector 17 is amplified by amplifier 18 and indicated on a meter or recorder 19.

Referring to FIG. 2, there is shown the total transmission of infra-red radiation, of fixed wavelength, through a number of fuel and water emulsions each of equivalent composition and containing 5 percent, by volume, immiscible water. The emulsions differ only in the average particle diameter of the discontinuous phase. The percentage of total transmitted infra-red radiation, determined from the curves, is tabulated at the upper right-hand portion of FIG. 2 with the corresponding absorbance. It is apparent that there is no relationship between the amount of radiation absorbed by the sample and the concentration of water therein which could be used for spectrophotometric determination of water content in immiscible fluids.

Curves 20, 21, 22, 23, 24, 25 and 26 of FIG. 2, represent the total transmission of infra-red radiation through a series of water and oil emulsions all having a water content of 5 percent by volume where the discontinuous (water) phase of the emulsion is in the form of particles having average diameters of 0.5, 0.6, 2.5, 4.5, 8.0, and 12.5 microns respectively. The emulsions were prepared by vigorous mixing of 95 percent oil and 5 percent water by volume until the desired particle size was obtained. The average particle size of each emulsion was determined by direct measurement under a microscope. Transmission measurements were made using an infra-red spectrometer employing electromagnetic radiation having a spectral interval of 2 to 4 microns in wavelength for each of the samples tested. The length of the transmission path was the same (0.1mm) for each of the samples. Although the concentration of water in all samples is the same, the intensity of the (—OH) absorption band at 2.9 microns varies from almost zero to 100 percent absorption. The progressive spectral changes from one sample to the next result from two different effects, both of which are related to particle size. First, as the particle size decreases the scattering increases as indicated by the general lowering of the transmission curve over the interval from 2 to 4 microns. When the average particle size has become approximately equal to the wavelength of the transmitted radiation, further reduction in particle size results in less scattering. Second, there is a progressive error in the absorptivity of the (—OH) band at 2.9 microns arising from the effective open area or space between particles in the transmission path. This error is substantial for large particle sizes, where the open area between particles is at a maximum. This is shown in FIG. 2, by the almost complete lack of absorption at 2.9 microns for sample 26. This error diminishes and absorption becomes stronger with decreasing particle size because the apparent open area between particles, viewed along the optic axis, becomes less. The effects just described would also be apparent for emulsions of other concentrations. Transmission errors arising from the first effect would increase with increasing concentration, and for the second effect would decrease with increasing concentration.

In addition to the above noted problems, water emulsified in fuel generally increases the fuels viscosity making it difficult, when using a continuous pipe line analyzer, to force the emulsified fuel through the measuring cell, without damage, at a rate sufficient to give analytical results before the fuel is burned. The emulsion viscosity also limits the concentration of water that can be measured to concentrations at which the fuel will flow through the analyzer or about 45 percent water when emulsified with Navy Special fuel oil. A further problem in measuring emulsions, especially using batch techniques, is emulsion separation which results in the infra-red beam passing through a sample containing a disproportionate amount of either fuel or water. All of the difficulties experienced in analyzing a fluid containing immiscible water are eliminated using the process of this invention. A solution is prepared by dissolving the immiscible fluid in solvent having an affinity for both water and the fluid and which is capable of mutually and simultaneously dissolving all components of the immiscible fluid. In solution the particle size of the discontinuous phase is reduced to the ultimate and molecular no is achieved. Dispersed particles are NO longer present to scatter transmitted radiation. The solution, when subjected to electromagnetic radiation, no longer is adversely affected by a discontinuous phase and absorbs radiation in proportion to the concentration of water present therein giving an accurate indication of the relative proportion of immiscible water initially present in the fluid.

While the method of this invention is applicable to any fluid containing immiscible water, it is most applicable to fuels, particularly Navy Special fuel oil, where water contamination is quite common and where the rapid determination of water content is difficult. Navy Special fuel oil is described in Military Specification MIL–F–859D, 21 Dec. 1956 as amended 20 Nov. 1958. Navy Special fuel oil has a minimum flash point (closed cup) of 150°F, a minimum and maximum viscosity at 122°F of 85 SSU and 225 SSU respectively and a minimum A.P.I. gravity of 11.5.

It is apparent that the particular solvent or solvents selected, to dissolve both the water and the fluid in which the water is immiscible simultaneously, is dependent to some degree on the particular fluid being analyzed. The solvent must be miscible with both water and the fluid so that a homogeneous solution can be formed which will not interfere with transmitted radiation. The solvent should not contain functional groups, such as hydroxy, primary and secondary amino or keto groups that absorb appreciable radiation at or near the wavelengths chosen for the analysis of water. While the solvent may absorb radiation at some of the same wavelengths as water, at least one portion of the spectrum, preferably that portion about 2.9 microns wavelength, where water causes strong absorption, must be free of appreciable solvent interference so that the relative absorption of radiation by the water present may be ascertained and used as a measure of the water content. In addition to the primary requirements set forth above there are a number of secondary factors which should be given weight, if possible, in selecting the solvent. These factors are; flammability, boiling point, flash point, stability, cost, odor, viscosity, and the availability of the solvent in quantity. Very few solvents will meet all of these criteria. N-ethyl morpholine has been identified as the solvent that best meets most of the desired criteria set forth above. It is fairly expensive and has an unpleasant ammoniacal odor when mixed with water. The spectrum of N-ethyl morpholine is essentially the same as that of fuel oil in the preferred region of infra-red measurement around 2.9 microns in wavelength. It does not absorb strongly in any of the regions where water absorbs. N-ethyl morpholine is readily miscible with both fuel oil and water. It is also miscible with fuel oil and water mixed in any proportion, as long as the mixture does not exceed twenty percent of the solution by volume.

The best ratio of solvent to fuel oil emulsion for the analytical solution depends on several factors. The ratio must be high enough to hold both phases of a high water content emulsion in solution. The solution must not be so dilute, however, as to preclude the accurate determination of water in low water content emulsions. A ratio of four parts of N-ethyl morpholine to one part of emulsion has been found to hold both phases of the emulsion in solution when the water content of the emulsion varies from 0 to 100 percent. The resulting solution is clear and transparent and of suitable viscosity.

Other examples of solvents which meet the most important of the previously listed criteria are tetrahydrofuran and bis(2-ethoxy ethyl) ether. Many other suitable solvents are available if one can dispense with certain criteria, e.g. the requirement for absence of a

functional group. For the method of this invention this requirement is not absolutely essential because the strong absorption introduced by the presence of the keto group would be constant (since the proportion of solvent to oil to be analyzed is metered and accurately controlled) and would cancel out in relating transmission to water content. Furthermore a major water absorption band for water in the 2.9 micron region is not interferred with by the keto group. In addition to employing single solvents, mixtures of two or more solvents, not completely suitable in themselves, may be more suitable than any one of them used singly.

The following specific examples are given to illustrate the use of solvent for dissolving a fluid containing immiscible water. It is to be understood that these examples are merely illustrative and are not intended in any way to limit the scope of this invention.

EXAMPLE 1

Equal parts of water and a cracked Navy Special fuel oil were combined and mixed vigorously to form an emulsion. Four parts of tetrahydrofuran was mixed with one part emulsion in a test tube. The terahydrofuran dissolved both the water and oil phases of the emulsion and formed a solution.

EXAMPLE 2

N-ethyl morpholine, was mixed in a similar manner with the water and oil emulsion used in example 1. A portion of the oil phase remained undissolved using four parts solvent to one part emulsion. Complete solubilization was obtained by increasing the quantity of solvent.

EXAMPLE 3

A (non-cracked) Navy Special fuel oil was emulsified with water following the procedure used in example 1. Four parts of N-ethyl morpholine was mixed with one part of emulsion. The N-ethyl morpholine completely dissolved both the water and oil phases of the emulsion and formed a solution. Further mixtures were prepared and the solvent was found to be readily miscible with non-cracked Navy Special fuel oil and water mixtures in all proportions as long as the mixture of fuel oil and water did not exceed twenty per cent of the final solution by volume. It is apparent from comparing examples 2 and 3 that the type of oil employed influences, to some degree, the solvent used to form a solution. By combining solvents, fluids somewhat insoluble in small amounts of a single solvent, as in example 2, may be solubilized without the necessity of appreciably increasing the quantity of solvent employed. This technique is illustrated in example 4 and is extremely useful since as the proportion of solvent is increased the minimum percentage of water which can be determined is increased.

EXAMPLE 4

Equal parts of water and cracked Navy Special fuel oil were placed in a test tube and mixed vigorously to form an emulsion. Two parts N-ethyl morpholine and two parts tetrahydrofuran were mixed with one part of emulsion and shaken. The oil and water was solubilized to a greater extent than when using N-ethyl morpholine alone as in example 2, but to a lesser degree than full solubilization as occurred in example 1. While some fuel remained undissolved this was readily dissolved by increasing the proportion of tetrahydrofuran in the solvent mixture.

When dealing with fuels such as kerosene, containing fifty percent -y volume water, acetone has been successfully used to dissolve both phases of the emulsion.

In a similar manner other suitable solvents alone or in combination may be employed to completely dissolve fuels containing immiscible water for further processing in accordance with this invention. The following examples illustrate the use of infra-red spectroscopy, on solutions prepared by dissolving fuel emulsions in solvent, to ascertain the total water content of the emulsion.

EXAMPLE 5

Four parts N-ethyl morpholine was mixed with one part of an emulsion containing 5 percent water and 95 percent Navy Special fuel oil. Both the water and oil portions of the emulsion were completely dissolved by the solvent. The resulting solution was analyzed using the instrument shown in FIG. 1. In operation of the analyzer of FIG. 1, in accordance with this invention, the solution prepared above was placed in the sample cell 15. Infra-red radiation 32 was passed through the cell 15 having $CaF_2$ cell windows which cut off the transmitted spectra above 8.0 microns. A germanium filter 14 was used to cut off wavelengths below 1.8 microns. The filter 16 was not used since the cell windows acted as the filter. The infra-red radiation 32, leaving the cell, having a spectral window of 1.8 to 8.0 microns wavelengths passed to the detector 17 where the radiation incident on the detector was converted to an electrical signal which was amplified by amplifier 18 and passed to a radiometer 19. This meter was precalibrated giving a 4 percent deflection of full scale for N-ethyl morpholine solutions of oil and water containing 0.2 percent water. The total deflection of the radiometer scale was recorded. The water content indicated by the meter reading was in close agreement to the actual water content of the solution.

Where it is desired to continuously monitor the proportion of immiscible water, the solvent is metered, say by a metering pump, to the immiscible fluid passing to the cell 15. In this manner the ratio of solvent to fluid is fixed and direct reading of the radiometer 19 can be used to give the water content of the immiscible fluid.

In cases of small deflection by the radiometer, as when measuring low water content fluids, the deflection can be increased if desired by restricting the transmitted radiation incident on the detector to the spectral interval from 1.8 to 3.5 microns in wavelength. This is accomplished using a germanium filter to cut off lower wavelengths and quartz cell windows which cut off the higher wave lengths. Narrowing the spectral window, however, limits the maximum measurable water content of the fluid to about 30 percent. In most instances, over broad ranges of water concentration, a 1.8 to 8.0 micron interval is more suitable.

Greater instrument sensitivity and accuracy can be attained, if desired, by increasing the length of the transmission path of the cell 15. In general, water contents as low as ½ percent water to a maximum approaching 100 percent water can be determined with reasonable accuracy using a solvent to emulsion ratio of 4 or 5 to 1, a cell having a 0.2 millimeter transmission path and a spectral window of 1.8 to 8.0 microns.

EXAMPLE 6

To further illustrate the method of this invention a series of Navy Special fuel oil emulsions containing 5 percent water were prepared. The infra-red spectra for these emulsions is graphically illustrated by FIG. 2. It is apparent that the absorption data, because of its variability due to emulsion particles can not be used to determine the emulsion water content. The emulsions were then treated by the process of this invention. One part of each of the emulsions was mixed with four parts of N-ethyl morpholine which dissolved each of the emulsions. Each of the solutions, so prepared, was subjected to infra-red radiation having a spectral interval from 1.8 to 8.0 microns. The percentage absorption of infra-red radiation passing through the solution was measured by means of radiometer deflection and the relative proportion of water present in the original emulsion determined. Whereas the infra-red absorption FIG. 2 was not useable for indicating the water content of fuel oil, the total water values determined for the N-ethyl morpholine solutions of oil and water are equivalent, within experimental error, to the water actually present in the emulsion as is shown below.

| Average particle size of discontinuous phase prior to dissolving in solvent Microns | Actual water content in the emulsion % | Measured water* content in the emulsion % |
|---|---|---|
| 12.5 | 5.0 | 5.2 |
| 8.0 | 5.0 | 5.7 |
| 4.5 | 5.0 | 5.7 |
| 2.5 | 5.0 | 6.2 |

*Measured by infrared after dissolving in solvent.

EXAMPLE 7

Below are given results obtained by using the method of this invention to analyze emulsions containing up to 38.5 percent water with the remainder being Navy Special fuel oil. These emulsions were prepared, as previously, by mixing water and oil. No attempt was made to control the average particle size of the emulsion. A solution of solvent, oil and water was prepared from each emulsion by mixing one part of the each emulsion with four parts of the solvent N-ethyl morpholine. Each of the prepared solutions was placed in a 0.1 mm transmission cell and subjected to infra-red radiation having a spectral interval from 1.8 to 8.0 microns wavelength. The percentage of absorbed infra-red radiation for each solution was indicated by radiometer. The concentration of water present originally in the emulsion was determined using the known deflection of the radiometer indicator for a given concentration of water. It is readily apparent from the data below that the analyzer gave a rapid and accurate indication of the actual water content present in the fuel.

| Water Content of Fuel Oil-Water Emulsion | |
|---|---|
| Actual | Measured* |
| 38.5 | 38.5 |
| 4.7 | 5.5 |
| 5.5 | 5.0 |
| 1.0 | 0.7 |

* Measured, after dissolving in solvent, by spectrometer.

The method of this invention provides a means of ascertaining and measuring the relative water content of a fluid containing immiscible water by means of dissolving the fluid and water in a solvent to form a solution. Solublization of the immiscible component reduces viscosity, prevents phase separation, prevents absorption interference by the discontinuous phase and allows accurate and rapid determination of the quantity of immiscible water present in a fluid using spectrophotometric analysis.

Unless otherwise indicated all percentages herein are by volume.

Obviously many modification and variations of the present invention are possible in the light of the above teachings. It is therefore to be understood, that, within the scope of the appended claims, the invention may be practiced otherwise than specifically described.

The invention described herein may be manufactured and used by or for The Government of the United States of America for governmental purposes without the payment of any royalties thereon or therefor.

What is claimed and desired to be secured by Letters Patent of the United States is:

1. A method of measuring the water content of a liquid-water immiscible mixture which comprises forming a solution of said immiscible mixture with an organic solvent which is miscible therewith and does not appreciably absorb electromagnetic radiation in a portion of the spectrum at which water strongly absorbs, and passing a beam of electromagnetic radiation containing wavelengths at which water strongly absorbs through said solution and relating the radiation transmitted through said solution to the water content thereof.

2. The method as defined in claim 1, wherein the electromagnetic radiation is infrared radiation.

3. The method as defined in claim 2, wherein the radiation comprises wavelengths in the region of from about 1.8 to 8 microns.

4. The method as defined in claim 2, wherein the radiation includes wavelengths at about 2.9 microns.

5. The method as defined in claim 1, wherein the liquid-water immiscible mixture is a fuel oil-water mixture.

6. The method as defined in claim 1, wherein the organic solvent is selected from the group consisting of N-ethylmorpholine, tetrahydrofuran, bis(ethylhexyl)ether and mixtures thereof.

* * * * *